F. SCHMIDT.
PNEUMATIC SPRING SUPPORT FOR MOTOR VEHICLES.
APPLICATION FILED SEPT. 22, 1919.
1,371,648.
Patented Mar. 15, 1921.
2 SHEETS—SHEET 1.
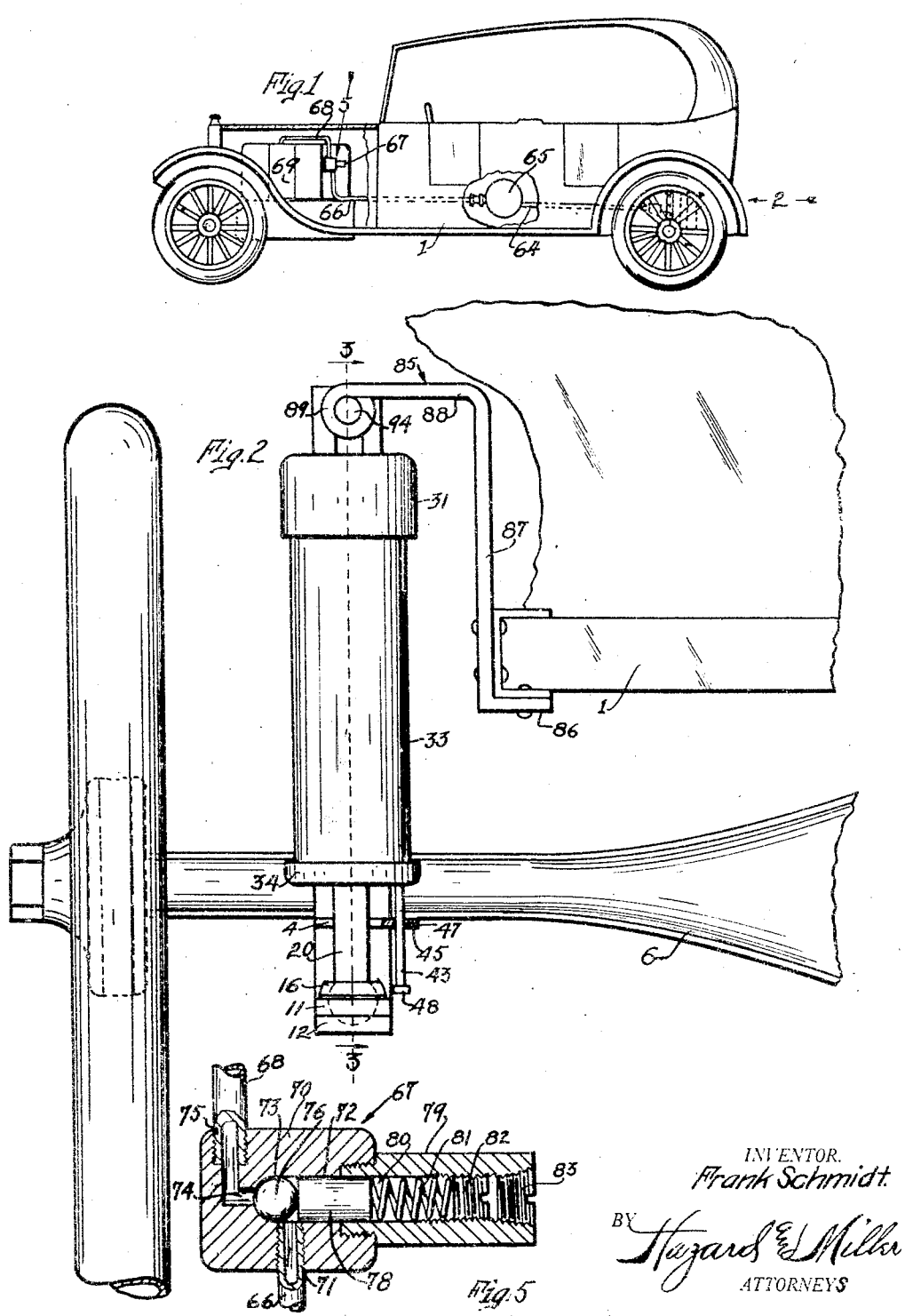
INVENTOR.
Frank Schmidt.
BY
Hazard & Miller
ATTORNEYS F. SCHMIDT.
PNEUMATIC SPRING SUPPORT FOR MOTOR VEHICLES.
APPLICATION FILED SEPT. 22, 1919.
1,371,648.
Patented Mar. 15, 1921.
2 SHEETS—SHEET 2.
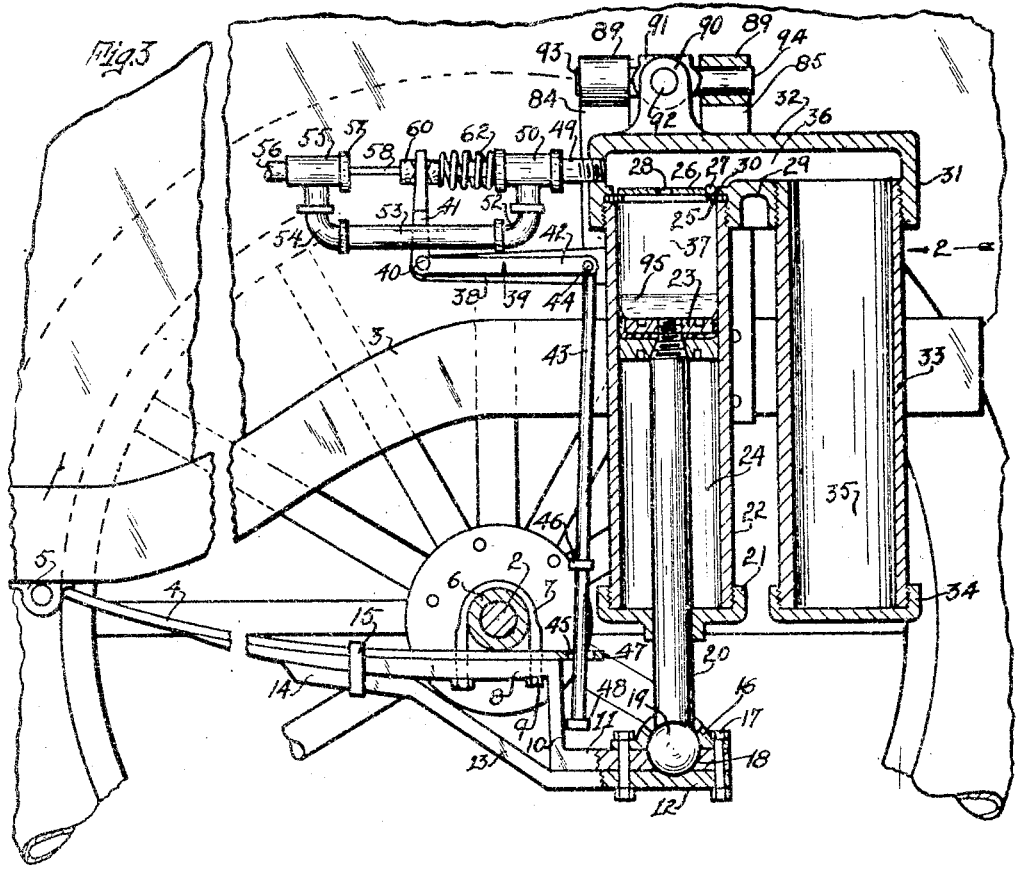
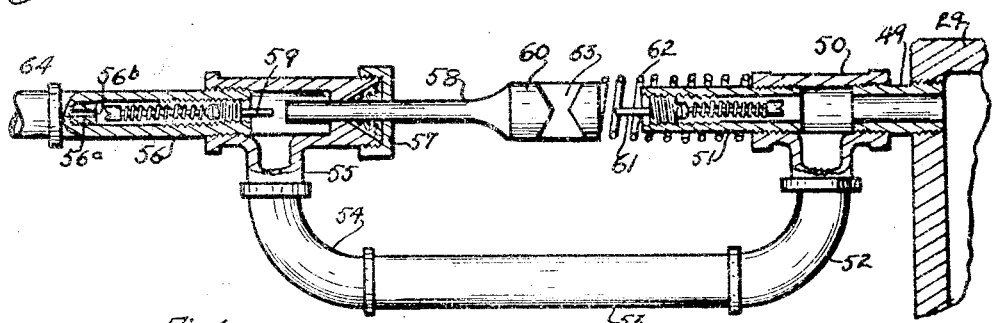
INVENTOR.
Frank Schmidt
BY Hazard & Miller
ATTORNEYS

UNITED STATES PATENT OFFICE.

FRANK SCHMIDT, OF TUCSON, ARIZONA.

PNEUMATIC SPRING-SUPPORT FOR MOTOR-VEHICLES.

1,371,648.                    Specification of Letters Patent.          Patented Mar. 15, 1921.

Application filed September 22, 1919.   Serial No. 325,542.

*To all whom it may concern:*

Be it known that I, FRANK SCHMIDT, a citizen of the United States, residing at Tucson, in the county of Pima and State of Arizona, have invented new and useful Improvements in Pneumatic Spring-Supports for Motor-Vehicles, of which the following is a specification.

My object is to make a pneumatic spring support for motor vehicles and my invention consists of the novel features herein shown, described and claimed.

Figure 1 is a side elevation of a motor vehicle provided with a pneumatic spring support in accordance with the principles of my invention, parts being broken away and shown in section.

Fig. 2 is an enlarged fragmentary rear elevation showing the near rear wheel, a portion of the rear axle and the pneumatic spring support, the view being taken looking in the direction indicated by the arrows 2 in Figs. 1 and 3.

Fig. 3 is a vertical cross section on the line 3—3 of Fig. 2 and looking in the drection indicated by the arrows.

Fig. 4 is an enlarged sectional detail of the check valves shown in Fig. 3.

Fig. 5 is an enlarged sectional detail of the check valve indicated by the arrow 5 in Fig. 1.

The central portion of the motor vehicle body 1 is substantially on the level with the rear axle 2 and the rear portion 3 of the body curves upwardly and backwardly over the axle 2. A leaf spring 4 is connected to the straight portion of the body 1 by a stirrup 5 and the leaf spring 4 passes backwardly under the rear axle housing 6 and is secured to the axle housing by a U-clip 7. A bracket arm 8 fits upwardly against the spring 4 and the arms of the clip 7 extend through the bracket arm 8 and nuts 9 are placed upon the U-clip below the bracket arm 8. A second bracket arm 10 extends downwardly from the rear end of the arm 8 and a third bracket arm 11 extends backwardly from the lower end of the arm 10. The brace arm 12 fits upwardly against the arm 11.

The arm 13 extends forwardly and upwardly from the brace arm 12 and the arm 14 extends forwardly from the arm 13 and fits against the arm 8. A clip 15 embraces the spring 4, the arm 8 and the arm 14. A bearing cap 16 fits downwardly upon the arm 11 and bolts 17 connect the bearing cap 16, the arm 11 and the arm 12 rigidly together. The cap 16 and the arm 11 form a socket 18 and the bearing ball 19 fits in this socket 18. The piston rod extends upwardly from the bearing ball 19. The piston cylinder cap 21 fits upon the piston rod 20, the piston cylinder 22 is screwed into the cap 21 and the piston 23 is fastened upon the piston rod 20 in the piston cylinder chamber 24. The flange ring 25 fits against the upper end of the piston cylinder 22, the flap door 26 is secured to the flange ring 25 by a hinge 27 and swings downwardly against the ring 25 to close the opening through the ring. A vent 28 is formed through the door 26. The cap 29 is screwed down upon the piston cylinder 22 and has a flange 30 engaging the flange 25 to hold the check valve thus formed in place. The cap 31 is connected to the cap 29 by a neck 32. The air cylinder 33 is screwed up into the cap 31 and a cap 34 is screwed upon the lower end of the cylinder 33. The chamber 35 in the cylinder 33 is connected to the chamber 24 in the cylinder 22 by the passage 36 through the neck 32. The ring 25 and door 26 form a check valve to hold the air pressure from passing from the chamber 35 through the passage 36 to the chamber 24 and the port 28 forms a limited passage for this fluid pressure. In other words the door 26 and port 28 form a dash pot connection between the compressed air portion 37 of the chamber 24 above the piston 23 and the compressed air chamber 35.

A supporting bracket 38 extends forwardly from the upper end of the cylinder 22, a bell crank lever 39 is pivotally connected to the forward end of the bracket 38 by a pin 40, one arm 41 of the bell crank lever being normally vertical and the other arm 42 being normally horizontal. A link 43 is connected to the rear end of the horizontal arm 42 by a pin 44 and the link 43 extends downwardly through an opening 45 in the rear end of the spring 4. A stop 46 is fixed upon the link 43 said stop being normally some distance above the projection 47 of the spring 4 through which the opening 45 is formed and a second stop 48 is fixed upon the extreme lower end of the link 43, said stop 48 being normally some distance below the projection 47. The stops 46 and 48 are located so that when the piston 23 goes down to a point near to the bottom of the chamber 24 the stop 48 will engage the projection 47 and operate the bell crank lever 39 one way and when the piston 23 goes up near to the top of the chamber 24 the stop 46 will engage the projection 47 and operate the bell crank lever 39 the other way.

A pipe nipple 49 is tapped into the cap 29 above the flange 30. A T 50 is screwed between the nipple 49. A check valve 51 is screwed into the opposite end of the T 50 from the nipple 49, an elbow 52 is connected to the side outlet of the T 50, a pipe 53 is connected to the elbow 52, a second elbow 54 is connected to the pipe 53, a second T 55 has its side outlet connected to the elbow 54, a check valve 56 is connected to the forward end of the T 55, and the stuffing box 57 is formed upon the rear end of the T 55. A plunger 58 is slidably mounted through the stuffing box 57 to engage the operating stem 59 of the check valve 56. A head 60 is formed upon the rear end of the plunger 58 to engage the operating stem 61 of the check valve 51, and an expansive coil spring 62 is placed around the check valve 51 against the T 50 and against the head 60, the tension of the spring being exerted to push the head 60 away from the stem 61 and allow the check valve 51 to close. A seat 63 is formed in the head 60 and the upper end of the arm 41 of the bell crank lever 39 engages the seat 63 so that the stops 46 and 48 operate the check valves 51 and 56. A pipe 64 connects the check valve 56 to a compressed air storage tank 65. A pipe 66 connects the tank 65 to the check valve 67 and a pipe 68 connects the check valve 67 to one of the compression chambers of the engine 69.

The check valve 67 consists of a block 70 having a screw threaded bore 71 extending from the lower side to a plunger bore 72 extending from the rear side to a valve seat 73, a port 74 leading from the valve seat 73 and an internal screw threaded bore 75 at right angles to the port 74 and into which the pipe 68 is screwed. The pipe 66 is screwed into the bore 71. A valve ball 76 fits against the seat 73. A plunger 78 fits in the bore 72 against the ball 76. A casing 79 is screwed into the rear side of the block and has a bore 80 into which the plunger 78 extends. An expansive coil spring 81 fits in the bore 80 against the plunger 78 and an adjusting plug 82 is screwed into the outer end of the bore 80 against the spring 81. A second plug 83 is screwed into the extreme outer end of the bore 80 to cover the adjusting plug 82.

When the engine 69 is in operation the explosion against the piston will shoot a part of the gas through the pipe 68 and unseat the valve 76 and discharge the gas into the storage tank 65 until the resistance of the valve 76 is greater than the force of the explosion. The resistance of the valve 76 is regulated by adjusting the plug 82 and is equal to the pressure of the spring 81 plus the back pressure from the tank 65. When the pressure in the tank has been raised sufficiently, the valve 76 will remain seated and the explosion of the engine will go the usual way.

The pneumatic spring support construction shown in Figs. 2, 3 and 4 is duplicated at each end of the rear axle 2. The brackets 84 and 85 are secured to the sides of the rear portion of the body 1 and each bracket has an L-shaped portion 86 fitting against the body 1, an arm 87 extending straight up outside of the body 1, an arm 88 extending straight out from the top of the arm 87 and a bearing 89 at the outer end of the arm 88. A bifurcated bearing 90 extends upwardly from the cap 29, a block 91 is mounted in the bifurcation of the bearing 90, a pin 92 extends through the bearing 90 and through the block 91, and pintles 93 and 94 extend forwardly and backwardly from block 91 through the bearings 89 of the brackets 84 and 85 so as to connect the body 1 of the vehicle to the pneumatic spring support and so as to allow a suitable amount of flexibility so that the body 1 may go up and down relative to the axle 2 and so that the body 1 may be supported by the fluid pressure in the chamber 37 against the piston 23. Preferably the piston 23 is flooded with oil 95.

The dash pot construction will control the action of the piston 23 and serve as a shock absorber to regulate the rebound.

When the load upon the body 1 is light the reaction of the pressure against the piston 23 will raise the load and the body 1 will go up relative to the axle 2 until the stop 48 strikes the projection 47 thus operating the bell crank lever 39 to open the check valve 51 and release the pressure to the desired extent so that the light load will ride easy as upon light springs. Then as the load is increased the body 1 will go down, the bell crank lever 39 will be operated the other way to open the check valve 56 and admit the pressure from the tank 65 to the cylinders to the desired extent so that the heavy load will ride easy, and when the pressure in the tank 65 goes below normal the check valve 67 will open and the pressure in the storage tank 65 will be replenished by the action of the engine 69.

Thus I have produced a pneumatic spring support for motor vehicles having means whereby the tension of the spring support is automatically regulated by the load or lack of load, the tension of the spring support being maintained from a storage tank, and there being means whereby the storage tank pressure is automatically maintained at the desired point by the action of the engine and directly from the explosion chamber of the engine.

A plug 56ᵃ is fixed in the forward end of the check valve 56 and has a reduced opening 56ᵇ, so that when the wheels drop as in crossing a ditch and the piston 23 goes up in the cylinder the jolt will only let a little more pressure into the piston chamber 37.

In adjusting the check valve 67 the pressure of the spring 81 should be greater than the compression pressure in the engine.

Various changes may be made without departing from the spirit of my invention as claimed.

I claim:

1. A pneumatic support for motor vehicles comprising a bracket arranged to be fixed to the axle of the vehicle and having a socket bearing, a piston and rod having a ball adapted to the socket bearing, a cylinder for the piston arranged to be fixed to the body of the vehicle having a closed top, an air inlet and discharge means connecting with the top of the cylinder, a rod for operating the air inlet and discharge means adapted to be actuated by a vertical motion of the axle or of the vehicle, there being two stops upon the rod spaced from each other, and an arm arranged to be carried by the axle of the vehicle and disposed to operate upon the rod and engage the stops at the end of a certain distance of vertical motion of the axle or the vehicle.

2. In a pneumatic support for motor vehicles in combination, means arranged to be connected with the axle of the vehicle forming a bearing for a piston rod, a piston and rod supported by the bearing, a cylinder for the piston arranged to be fixed to the vehicle body and having a valve at its upper end opening outwardly, an air capacity chamber communicating with the cylinder above the valve, an air inlet and discharge means connected with the cylinder above the valve, and means arranged to be connected with the axle of the vehicle to properly operate the air inlet and discharge means.

3. A pneumatic support for motor vehicles comprising a bracket arranged to be fixed to the axle of the vehicle and having a socket bearing, a piston and rod supported by the socket bearing, a cylinder for the piston arranged to be fixed to the body of the vehicle and having a valve at its upper end opening outwardly, an air capacity chamber in communication with the cylinder above the valve, an air inlet and discharge means connecting with the cylinder above the valve, a rod disposed vertically for operating the air inlet and discharge means and adapted to be actuated by the vertical motion of the axle or of the vehicle, there being two stops upon the rod properly spaced from each other, and an arm arranged to be carried by the axle and disposed to operate upon the rod to engage the stops at the end of a certain distance of vertical travel of the axle or the vehicle body, In testimony whereof I have signed my name to this specification.

FRANK SCHMIDT.